Figure 1:
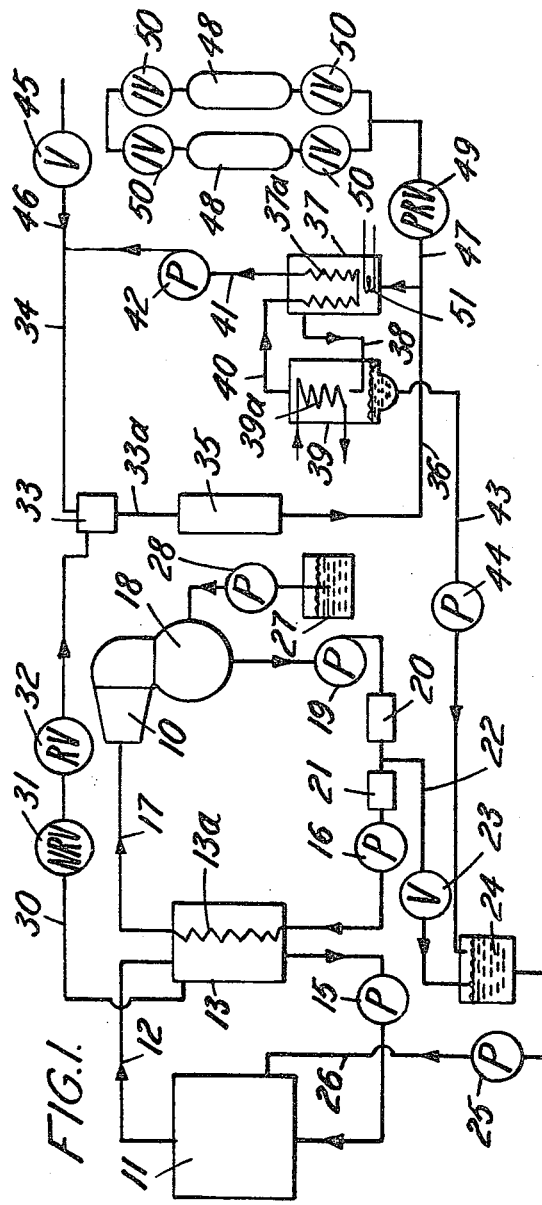

Dec. 11, 1962     H. J. COLES ET AL     3,068,164

NUCLEAR REACTOR STEAM GENERATING PLANT

Filed May 2, 1960

INVENTORS

Harald John Coles
Graham William Sneddon

By

Watson, Cole, Grindle & Watson

ATTORNEYS

_United States Patent Office_

3,068,164
Patented Dec. 11, 1962

3,068,164
NUCLEAR REACTOR STEAM GENERATING
PLANT
Harold John Coles, and Graham William Sneddon, London, England, assignors to Mitchell Engineering Limited, London, England, a British company
Filed May 2, 1960, Ser. No. 25,998
Claims priority, application Great Britain May 4, 1959
6 Claims. (Cl. 204—193.2)

This invention relates to steam generating plant, and is concerned with steam generators deriving heat originally from a nuclear reactor. In such generating plant, steam for use, as for driving a turbine, may be generated in a heat exchanger by heat absorbed from the reactor coolant fluid. The reactor coolant fluid is often either water or steam and in this case the primary fluid flowing through the heat exchanger is also in the form of steam.

When steam is exposed to radiation from radio-active matter (especially in the reactor itself, and also by proximity to a heat-exchange medium having induced radioactivity) it is subject to radiolysis, that is, partial decomposition into free hydrogen and oxygen. These gases are referred to as non-condensable gases, and tend to accumulate with undesirable effects; including some explosion hazard. These effects are especially worked when steam or water is used as a primary coolant.

It is a generaly object of the invention to reduce the undesirable effects of non-condensable gases produced in steam generating plant incorporating a nuclear reactor as a source of heat.

The invention provides, in steam generating plant including a nuclear reactor as a source of heat, apparatus for removing non-condensable gases from the plant comprising a catalyst chamber containing a catalyst adapted to effect recombination of the non-condensable gases, a superheating device, and feed means arranged to conduct steam from the plant together with non-condensable gases, successively to the superheater and thence to the catalyst chamber.

The apparatus may include means for conducting gases leaving the catalyst chamber through the superheater in heat-exchange contact with the steam and non-condensable gases passing through the superheating device towards the catalyst chamber. The chemical recombination reaction in the catalyst chamber is exothermic, and the resulting heat in the steam leaving the catalyst chamber is used to heat the steam and non-condensable gases entering the superheating device. In any case, however, ancillary means are desirable for heating the superheater, at least for starting. Many of the suitable catalysts, including that which is preferred, namely, palladinized alumina, are temporarily poisoned by moisture, and the purpose of the superheater is to dry the steam before it enters the catalyst chamber.

The apparatus also preferably includes means to introduce a diluent gas into the steam and non-condensable gases abstracted from the steam generating plant, the diluent being for example compressed air. Such diluent facilities control the superheating operation, and assist to avoid overheating of the catalyst.

In one preferred arrangement, the superheating device is a mixing chamber having a first inlet connected to the feed means and a second inlet for compressed air and an outlet for the mixture of steam, air and the non-condensable gases connected to the catalyst chamber, and there is provided a heat exchanger having a first flow path connected to receive the mixture of steam and air leaving the catalyst chamber and a second flow path, a condenser which is connected to receive the mixture leaving the first flow path of the heat exchanger and in which steam is condensed, the condenser having an air outlet connected to the second flow path of the heat exchanger, and a gas circulator connected to abstract air from the second flow path and to deliver it to the second inlet of the heat exchanger. A heating coil may be provided at the entry of the first flow path of the heat exchanger for starting up purposes. Besides the advantage in economy and general convenience of such a closed-circuit system, a further advantage accrues in that any gaseous fission products which may be for any reason (such as minor leakage or accident) present in the steam generating plant, are withdrawn and retained in the recombining circuit.

Figure 2:
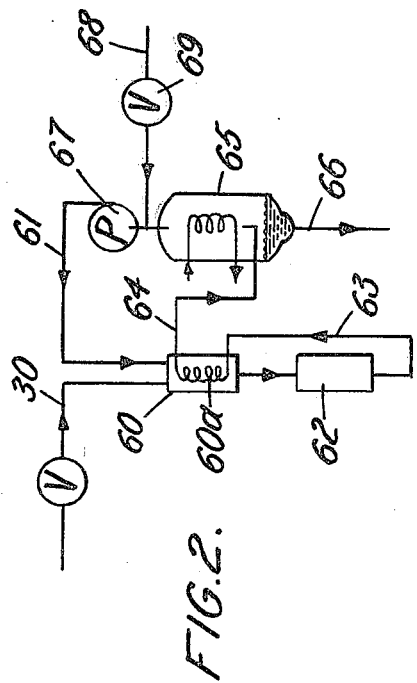

Two forms of apparatus for removing non-condensable gases from steam generated in a nuclear reactor will now be described with reference to the accompanying diagrammatic drawings, in which:

FIGURE 1 shows a first form of apparatus, and
FIGURE 2 shows a modified form of apparatus.

The apparatus (FIGURE 1) is shown in connection with a steam generating plant for supplying steam to a turbine 10.

The steam generating plant comprises a primary circuit including a nuclear reactor 11 forming a source of heat, a coolant outlet connection 12, a heat-exchanger 13 having a first flow path fed by the connection 12 and a coolant return connection 14 containing a pumping arrangement 15 delivering coolant fluid from the first flow path back to the reactor 11. The reactor 11 may be a boiling water reactor, as described for instance in Paper P/1801 of the 2nd International Conference on Peaceful Uses of Atomic Energy, or a boiling heavy water reactor, such as the Halden reactor described in Paper P/559 of the same conference, or a steam-cooled reactor, or any other form of reactor in which light or heavy water or steam is used as a coolant and in which steam is generated or superheated by passage through the reactor.

The steam generating plant also includes a secondary circuit including the turbine 10. Steam for operating the turbine is generated in the heat exchanger 13, water being fed by pump 16 into the second flow path 13a of the heat exchanger where the water is vaporised by heat exchange with the coolant from the reactor 11. The steam is led from the flow path 13a to the turbine 10 by conduit 17. The steam leaving the turbine 10 is condensed in condenser 18 and the condensate is delivered by extraction pump 19 through an ion exchange column 20 and de-aerator 21 to the inlet of the pump 16. A tapping 22 containing a regulating valve 23 abstracts some of the condensate from the circuit at a point between the ion-exchange column 20 and the de-aerator 21 and delivers the condensate to a make-up tank 24 from which the coolant supply for the reactor 11 is made up. In the case of a boiling water reactor the make-up water is delivered by pump 25 through pipe 26 directly into the reactor 11.

The flow in the secondary circuit of the heat exchanger 13 is made up from tank 27 by pump 28 which delivers into the condenser 18.

In operation, the steam in the reactor 11 is subjected to radiolysis which results in some of the steam being decomposed into free hydrogen and oxygen and these gases tend to accumulate particularly in the heat exchanger 13, and this invention provides means by which the undesirable effects of such gases can be mitigated.

In the form shown, an extracting connection 30 leads from the upper end of the first flow path through the heat exchanger 13 to a recombining system, the connection 30 containing a non-return valve 31 and a regulating valve 32. The connection 30 delivers a small proportion, say ⅔%, of the steam delivered into the heat exchanger 13, together with the non-condensable gases, from the primary circuit into a mixing chamber 33 where dilution is effected by the steam and non-condensable gases being mixed with compressed air from conduit 34. The mixture flows from the mixing chamber 33 through conduit 33a into a catalyst chamber 35 where it passes through a catalyst bed, for example a bed of palladium-alumina catalyst (to recombine the hydrogen and oxygen. The steam/air mixture leaving the chamber 35 is at a higher temperature than that of the mixture entering the chamber, and it is led from the chamber 35 by conduit 36 to one flow path of a heat-exchanger 37 where the temperature of the mixture is reduced by heat exchange with fluid flow in the second path 73a of the heat exchanger. The steam/air mixture leaving the heat exchanger 37 is led by conduit 38 to a condenser 39 where the greater part of the steam in the mixture is condensed by passing over a cooling coil 39a. The air leaving condenser 39 by conduit 40 contains a small quantity of steam and is reheated by passage through the second path 37a of the heat exchanger 37. The heated air next flows through duit 41 to gas circulating pump 42 which feeds the air into conduit 34.

The condensate from the condenser 39 is delivered through flow path 43 containing a pump 44 and also water purification equipment (not shown) to the make-up tank 24.

It will be seen that the dilution air circulates in the closed path recombining system, and make-up air is derived from a compressed air source through a regulating valve 45 connected in a conduit 46 leading to conduit 34. In order to avoid excessive pressures in the system, a branch conduit 7 leads from the conduit 36 to gas cylinders 48, the branch conduit 47 containing a pressure relief valve 49. The cylinders 48 may be isolated from the conduit 47 and one another by isolating valves 50.

The heat exchanger 37 contains an electric heating coil 51 which is energised during starting up.

In a typical arrangement, the temperatures, pressures volumes, and fluid compositions at various points in the recombining system may be as follows:

| Circuit part | Pressure p.s.i.a. | Temp., °F. | Vol. Cu. ft. | Composition/hour, lbs. |
| --- | --- | --- | --- | --- |
| conduit 30 | 900 | 512 | 83.0 | Steam 138; $O_2$ 12; $H_2$ 1·5. |
| conduit 34 | 900 | 457 | 320.0 | Steam 6.5; Air 838. |
| conduit 33a | 900 | 435 | 402.0 | Steam 144.5; $O_2$ 12; $H_2$ 1·5; Air 838. |
| conduit 36 | 900 | 656 | 498.5 | Steam 158; Air 838. |
| conduit 38 | 900 | 470 | 414 | Steam 158; Air 838. |
| conduit 40 | 875 | 198 | 236.5 | Steam 6.5; Air 838. |
| conduit 41 | 875 | 457 | 329.0 | Steam 6.5; Air 838. |

The steam in the conduit 30 is wet steam, but the steam leaving the mixing chamber 33 although at a lower temperature is dry steam, i.e. it is superheated in the mixing chamber. The steam in conduit 40 is wet steam, leaving the condenser, and is superheated in the heat exchanger 37 before passing along conduits 41 and 34, the degree of superheating, controlled if necessary by the electric heater 51, is such that it can provide superheating to the wet steam from conduit 30, in the mixing chamber, despite the temperature drop due to expansion on mixing.

In the form of recombining apparatus shown in FIGURE 2, steam, together with non-condensable gases, from pipe 30 flows into a heat exchanger 60 wherein it is superheated and mixed with diluent air from pipe 61, and then passes to the catalyst chamber 62. The steam and air mixture leaving the chamber 62 is at a higher temperature than the entering fluid and the mixture is conveyed by pipe 63 to coil 60a of the heat exchanger 60 where it is employed to superheat the steam entering the recombining system before it passes to the chamber 62. The mixture leaving coil 60a is conveyed by pipe 64 to a condenser 65 wherein the greater part of the steam is condensed, the condensate being conveyed away through pipe 66. The air leaving the condenser passes to a gas circulator 67 to be fed into pipe 61. A compressed air supply is connected to the circuit by pipe 68 containing a non-return regulating valve 69.

We claim:
1. In a steam generating plant of the class comprising a nuclear reactor as a source of heat, apparatus for recombining non-condensable gases from the plant comprising abstracting means abstracting said non-condensable gases and wet steam in admixture from said steam generating plant, a circulating circuit comprising a catalyst chamber having an inlet and an outlet, said chamber housing a catalyst which effects recombination of the non-condensable gases, and a steam condenser having an inlet connected to the outlet of the catalyst chamber and an outlet connected to the inlet of the catalyst chamber, means supplying an oxygen-containing diluent gas to said circuit at a point therein between said outlet of the condenser and the inlet of the catalyst chamber, a gas circulator circulating said diluent gas in said circuit, said abstracting means delivering said non-condensable gas/steam mixture to said circuit between the outlet of the condenser and the inlet of the catalyst chamber, whereby the diluent gas mixes with said non-condensable gas/steam admixture prior to entry into the catalyst chamber, and heat exchange means having a first flow path connected in said circuit in flow series between the outlet of the catalyst chamber and the inlet of the condenser and a second flow path connected in said circuit in flow series between said outlet of the condenser and the inlet of the catalyst chamber, whereby the steam in said admixture is superheated prior to entering the catalyst chamber by the heat generated during recombination of the non-condensable gases in the catalyst chamber.

2. Apparatus according to claim 1, said second flow path of the heat exchange means being connected in said circuit between the outlet of the steam condenser and the point in said circuit at which said abstracting means delivers into the circuit, whereby said diluent gas is heated by the heat generated in the catalyst chamber and said heated carrier gas on being mixed with the non-condensable gas/steam admixture superheats the steam in said admixture.

3. Apparatus according to claim 1, said second flow path of the heat exchange means being a mixing chamber and said abstracting means delivers the non-condensable gas/steam mixture into said mixing chamber to be mixed with said diluent gas circulating in said circuit, and the first flow path of the heat exchanger being a coil located in said mixing chamber, whereby the mixture of non-condensable gas, steam and diluent gas is heated by the fluid flowing from the outlet of the catalyst chamber and to the inlet of the condenser thereby to superheat the steam in the admixture.

4. Apparatus according to claim 1, said means supplying a diluent gas including a source of compressed air and a valve controlling the delivery of compressed air into the circuit at said point.

5. Apparatus according to claim 1, comprising a branch from said circuit at a point between the outlet of the catalyst chamber and the inlet of the condenser, a pressure relief valve in said branch, and gas storage cylinders connected to said branch to receive gas flowing from the circuit through the pressure-relief valve.

6. In a steam generating plant of the class comprising a nuclear reactor as a source of heat, apparatus for recombining non-condensable gases generated in the plant comprising a closed flow circuit comprising in flow series arrangement a mixing chamber having a first inlet, a catalyst chamber housing a catalyst which effects recombination of the non-condensable gases, a first heat exchanger flow path, a steam condenser, a second heat exchanger flow path disposed in heat exchange relationship to said first heat exchange flow path, and a gas circulator having an outlet, the outlet of the gas circulator being connected to the first inlet of the mixing chamber, said apparatus further comprising a second inlet to said mixing chamber, means abstracting said non-condensable gases and wet steam in admixture from the generating plant and delivering said admixture to the second inlet of the mixing chamber, a compressed air supply including a control valve connected to deliver compressed air into said circuit between said gas circulator outlet and said first inlet of the mixing chamber, a branch from said circuit between the catalyst chamber and the first heat exchange flow path, a pressure-relief valve in said branch and gas storage vessels connected to receive gas flowing in said branch through the pressure relief valve, whereby compressed air flowing in said circuit is heated in said second heat exchange flow path by heat generated in said catalyst chamber on recombination of the non-condensable gases and whereby said heated compressed air superheats the steam in said non-condensable gas/ steam admixture on being mixed therewith in said mixing chamber and prior to entry into the catalyst chamber.

References Cited in the file of this patent

UNITED STATES PATENTS

| | | |
|---|---|---|
| 2,879,146 | McElroy et al. | Mar. 24, 1959 |
| 2,920,025 | Anderson | Jan. 5, 1960 |
| 2,936,273 | Untermyer | May 10, 1960 |
| 2,938,845 | Treshow | May 31, 1960 |
| 2,945,794 | Winters et al. | July 19, 1960 |